(12) United States Patent
Wolf et al.

(10) Patent No.: US 7,500,852 B2
(45) Date of Patent: *Mar. 10, 2009

(54) TEACHING AID DEVICE AND METHOD OF TEACHING

(76) Inventors: Roger P. Wolf, 106 Purvis Rd., Butler, PA (US) 16001; Paula J. Wolf, 106 Purvis Rd., Butler, PA (US) 16001

( * ) Notice: Subject to any disclaimer, the term of this patent is extended or adjusted under 35 U.S.C. 154(b) by 0 days.

This patent is subject to a terminal disclaimer.

(21) Appl. No.: 11/903,614

(22) Filed: Sep. 24, 2007

(65) Prior Publication Data

US 2008/0020359 A1    Jan. 24, 2008

Related U.S. Application Data

(63) Continuation of application No. 10/764,742, filed on Jan. 26, 2004, now Pat. No. 7,273,375.

(60) Provisional application No. 60/442,671, filed on Jan. 24, 2003.

(51) Int. Cl.
    *G09B 19/02* (2006.01)
(52) U.S. Cl. .................. 434/188; 434/190; 434/191
(58) Field of Classification Search ................. 434/188, 434/190, 191, 192, 193, 209, 172, 175
    See application file for complete search history.

(56) References Cited

U.S. PATENT DOCUMENTS

| 0,062,156 | A | | 2/1867 | Robyn |
| 793,676 | A | | 7/1905 | Olivera |
| 1,136,663 | A | * | 4/1915 | Fox .............................. 434/175 |
| 1,455,522 | A | * | 5/1923 | Cress .......................... 434/175 |
| 1,735,883 | A | | 11/1929 | Smith |
| 3,746,343 | A | | 7/1973 | Shapiro |
| 3,831,295 | A | * | 8/1974 | Mackay ...................... 434/236 |
| 4,215,490 | A | | 8/1980 | Fewell |
| 4,330,285 | A | | 5/1982 | Mitchell, Jr. |
| 4,373,917 | A | | 2/1983 | Jackson |
| 4,560,354 | A | | 12/1985 | Fowler |
| 4,846,689 | A | | 7/1989 | Day |
| 4,880,384 | A | | 11/1989 | Murphy |
| 4,914,019 | A | | 4/1990 | Chu |
| 4,998,883 | A | | 3/1991 | Brinkley |

(Continued)

FOREIGN PATENT DOCUMENTS

EP    0702821 B1    3/1996

(Continued)

*Primary Examiner*—Kurt Fernstrom
(74) *Attorney, Agent, or Firm*—Bartony & Hare, LLP

(57) ABSTRACT

A device for instructing mathematics includes a work surface and a plurality of movable elements. Each of the movable elements includes, on a front surface thereof, at least a portion of a visible mathematical symbol (including numeric and nonnumeric symbols) thereon readable via eyesight. Each of the movable elements further includes an attachment member on a rearward surface to attach the element to the work surface. The attachment member preferably allows the element to be removed from the work surface and to be slidably positionable to any position on the work surface once attached thereto. The device can further include a frame around the work surface. Preferably, the frame defines a boundary for positioning of the movable elements. In one embodiment, magnetic attraction is used to maintain the attachment member in movable connection with the board.

25 Claims, 5 Drawing Sheets

U.S. PATENT DOCUMENTS

| | | |
|---|---|---|
| 5,033,964 A | 7/1991 | Phelps |
| 5,152,690 A | 10/1992 | Todd |
| 5,203,706 A | 4/1993 | Zamir |
| 5,391,078 A | 2/1995 | Murphy |
| 5,536,170 A | 7/1996 | Murphy |
| 5,551,877 A | 9/1996 | Murphy |
| 5,683,251 A | 11/1997 | Logan |
| 5,707,238 A | 1/1998 | Bush |
| 5,769,639 A | 6/1998 | Foster |
| 5,820,377 A | 10/1998 | Murphy |
| 5,865,627 A | 2/1999 | Foresman |
| 5,895,044 A | 4/1999 | Bahramian |
| 6,162,059 A | 12/2000 | Murphy |
| 6,196,847 B1 | 3/2001 | Karunamuni |
| D444,176 S * | 6/2001 | Leslie ............ D19/59 |
| 6,513,708 B2 | 2/2003 | Evans |

FOREIGN PATENT DOCUMENTS

WO      WO9429829 A1    12/1994

* cited by examiner

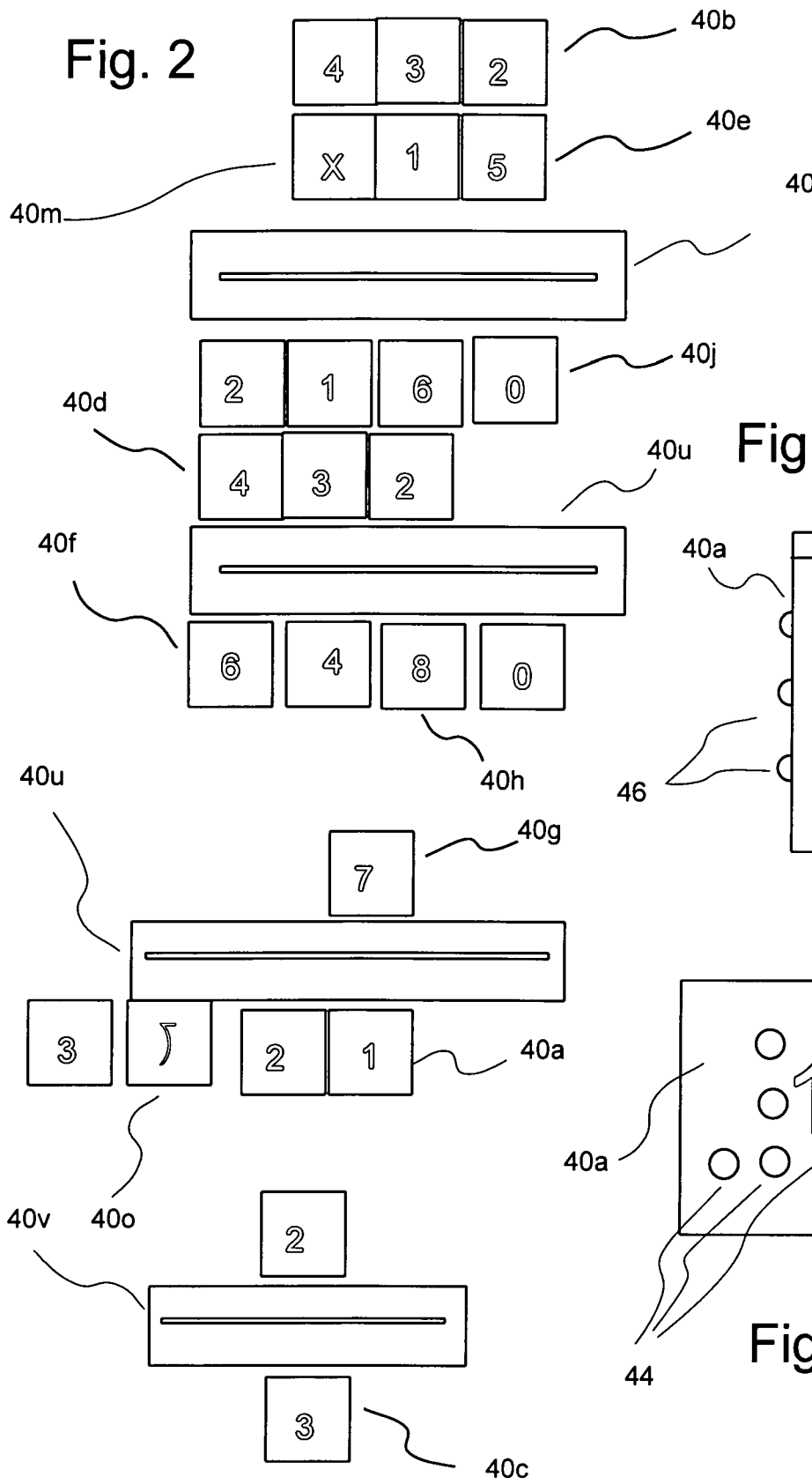

TEACHING AID DEVICE AND METHOD OF TEACHING

CROSS-REFERENCE TO RELATED PATENT APPLICATION

This application is a continuation application of U.S. patent application Ser. No. 10/764,742, which claims the benefit of U.S. Provisional Patent Application Ser. No. 60/442,671, entitled TEACHING AID AND METHOD OF TEACHING filed Jan. 24, 2003, the disclosures of which is incorporated herein by reference.

FIELD OF THE INVENTION

The present invention relates generally to a teaching or instruction aid device or system and to a method of teaching and, especially, to a teaching aid and a method of teaching to assist a visually impaired person in learning mathematics, including, but not limited to, addition, subtraction, multiplication, division, fractions, algebra and calculus.

BACKGROUND OF THE INVENTION

References set forth herein may facilitate understanding of the present invention or the background of the present invention. Inclusion of a reference herein, however, is not intended to and does not constitute an admission that the reference is available as prior art with respect to the present invention.

In the past, for various reasons, there has been only limited success in teaching visually impaired people mathematics. Often, without the aid of sight, a visually impaired or blind student of mathematics does not easily obtain the common or established look, feel and lexicon for numbers and simple mathematical operations that sighted students obtain. As well known to instructors of the visually impaired, the Braille System and the Nemeth Braille System are useful instruction tools in mathematics, but have substantial limitations. For example, because of the manner in which numbers and mathematical operators such as division are represented in those systems, the visually impaired quite often have difficulty in both understanding and/or following in a timely manner the spoken instructions provided to sighted students. These difficulties present a significant problem, for example, when a visually impaired student is taught in a classroom with students who are not visually impaired.

Over the years, a number of teaching aids have been developed for teaching mathematics and other subjects, but none of these teaching aids has adequately addressed the problems of teaching the visually impaired. U.S. Pat. No. 5,865,627, for example, discloses an educational system comprising a set of foam characters including numbers, operational symbols and advanced problem solving activities that include touch sensitive fasteners (hook and loop fasteners) which can be applied to a touch sensitive board. The characters are stored separately from the board and a student can carry out pre-algebraic calculations upon the surface by fastening the characters to the board. No provision is made in the device for the visually impaired to locate, read and/or position the characters. Moreover, application of the characters to the surface is rather cumbersome and slow, making it difficult for a student to apply the characters to the surface in a timely manner, for example, while following a teacher in a typical math class.

U.S. Pat. No. 4,373,917 also discloses an educational device for teaching arithmetical operations. The device includes a graph- or grid-like base member having a plurality of squares or individual boxes. The device includes packets of numerals for application to the board in a manner set by the grid and an optional rack for holding the numerals for retrieval. The device also includes various nonnumeric cards such as remainder cards, cross-out cards, decimal point cards, arrows, subtraction/addition/multiplication bars, and a long division symbol for application to the base member. The components can be applied to the board through the use of magnets. Like, U.S. Pat. No. 5,865,627, no provision is made for the visually impaired to use the device. Moreover, placing the characters on the grid of the base is likely to be too cumbersome to enable a student to timely use the device while following the instructions of a teacher in a classroom.

U.S. Pat. No. 5,769,639 discloses a frame with a number line attached to the top of the frame. A math problem is solved by counting the workpieces of the device while sliding them in horizontal grooves on the working surface of the frame. Each row of the frame has ten workpieces (corresponding to, for example, ones, tens, hundreds, thousands etc.) and is designed to allow the student to learn regrouping and place value when performing math problems. Addition and subtraction are done on one side of the work surface, while multiplication and division are done on the other side of the work surface. The workpieces are provided with numeral character and Braille indicia. The device operates in a fashion similar to an abacus and does not replicate the intuitive manner in which math is taught to a sighted student.

U.S. Pat. No. 4,560,354 discloses a math teaching device including an elongate frame with edge guides. A plurality of counting pieces are slidably mounted in an upper portion of the frame. The counting pieces are independently movable, and are retained in operative relationship with each other and to the frame by the guides. A display is provided behind the counting pieces which can include numerals and Braille indicia. The counting pieces are slid left and right within the frame to perform simple addition and subtraction operations. The device can also be used to teach place value. Like U.S. Pat. No. 5,769,639, the device of U.S. Pat. No. 4,560,354 does not replicate the intuitive manner in which math is traditionally taught to a sighted student.

U.S. Pat. No. 6,196,847 discloses a device for teaching the fundamentals of numbers and/or mathematics which includes a base having a front surface that includes a plurality of recesses, oriented in columns. Each column represents ones, tens and hundreds. The recesses receive numerical plates which are sized according to specific columns. An operator recess for receiving an operator plate is also provided to enable mathematical processes to be performed by the user. Numerals are provided on the front of plates and representative indicia such a corresponding number of dots. No provision is made to enable the visually impaired to use the device. Moreover, like several other devices discussed above, the device does not replicate the intuitive manner in which math is traditionally taught to a sighted student.

There is a need for a new system of instructing the visually impaired and other disabled students in mathematics.

SUMMARY OF THE INVENTION

In one aspect the present invention provides a device for instructing mathematics. The device includes a work surface and a plurality of movable elements. Each of the movable elements includes, on a front surface thereof, at least a portion of a visible mathematical symbol (including numeric and nonnumeric symbols) thereon readable via eyesight. Each of the movable elements further includes an attachment member on a rearward surface to attach the element to the work surface. The attachment member preferably allows the element to be removed from the work surface and to be slidably positionable to any position on the work surface once attached thereto. The device can further include a frame around the work surface. Preferably, the frame defines a boundary for positioning of the movable elements. In one embodiment, magnetic attraction is used to maintain the attachment member in movable connection with the board.

The visible symbols on the movable elements can, for example, be enlarged so as to be visible by a visually impaired person having some sight. The movable elements can be stored around the perimeter of the work surface to be readily available to a user of the device. Preferably, a plurality of movable elements are provided having the same symbol thereon for at least a portion of the symbols. In one embodiment, each of the plurality of movable elements having a like symbol thereon is stored in a group around the perimeter of the work surface, and each of the groups of movable elements having a like symbol thereon is spaced in position from the other groups. In another embodiment, each of the plurality of movable elements having a like symbol thereon is stored in a stacked group around the perimeter of the work surface, and each of the stacked groups of movable elements having a like symbol thereon is spaced in position from the other groups.

In still another embodiment, the movable elements are stored in a multicompartment storage container. Each of the movable elements having a different symbol thereon can, for example, be stored in separate compartments of the storage container. In the case that a plurality movable elements are provided having the same symbol thereon for at least a portion of the symbols, each of the plurality of movable elements having a like symbol thereon can be stored/grouped in a separate compartment within the storage container.

In one embodiment, each of the movable elements further includes indicia on the front surface thereof corresponding to the visible symbol that is readable via the sense of touch to identify the visible symbol (for example, Braille indicia or Nemeth Braille indicia).

The visible symbols can include, but are not limited to, numerals from 0 to 9, a plus sign, a minus sign, a multiplication sign, a division sign, an equal sign, and at least one type of bar for representing processes. The symbols can, for example, further include a decimal point, a question mark and a remainder symbol. Additional or alternative symbols as known in the mathematical arts can be provided for teaching, for example, algebra, trigonometry, geometry, calculus and/ or other subjects.

In another aspect, the present invention provides a method for instructing mathematics, including the steps:
providing a work surface to a student; and
providing a plurality of movable elements for use in connection with the work surface, each of the movable elements comprising on a front surface thereof at least a portion of a visible symbol readable via eyesight, each of the elements further comprising an attachment member on a rearward surface to attach the element to the work surface, the attachment member being adapted to allow the element to be removed from the work surface and to be slidably positionable to any position on the work surface once attached thereto.

In still a further aspect, the present invention provides a method of teaching mathematics in a class of students including at least one sighted student and at least one visually impaired student, including the steps:
creating mathematical equations on a display for viewing by the sighted student;
providing a work surface to a visually impaired student;
providing a plurality of movable elements for use in connection with the work surface, each of the movable elements comprising, on a front surface thereof, at least a portion of a visible mathematical symbol thereon readable via eyesight, each of the elements further comprising an attachment member on a rearward surface to attach the element to the work surface, the attachment member being adapted to allow the element to be removed from the work surface and to be slidably positionable to any position on the work surface once attached thereto; and
having the visually impaired student construct mathematical equations on the work surface which are displayed upon the display using the symbols of the movable elements by appropriate arrangement of the movable elements, the mathematical equations constructed by the visually impaired student being of substantially the same form as the mathematical equations created upon the display.

BRIEF DESCRIPTION OF THE DRAWINGS

FIG. 2 illustrates a front view of several arithmetic operations utilizing the teaching device of the present invention.

FIG. 3 illustrates an enlarged front view of an embodiment of one of the movable tiles or elements of the present invention.

FIG. 4 illustrates a side view of the movable element of FIG. 3.

DETAILED DESCRIPTION OF THE INVENTION

Figure 1:
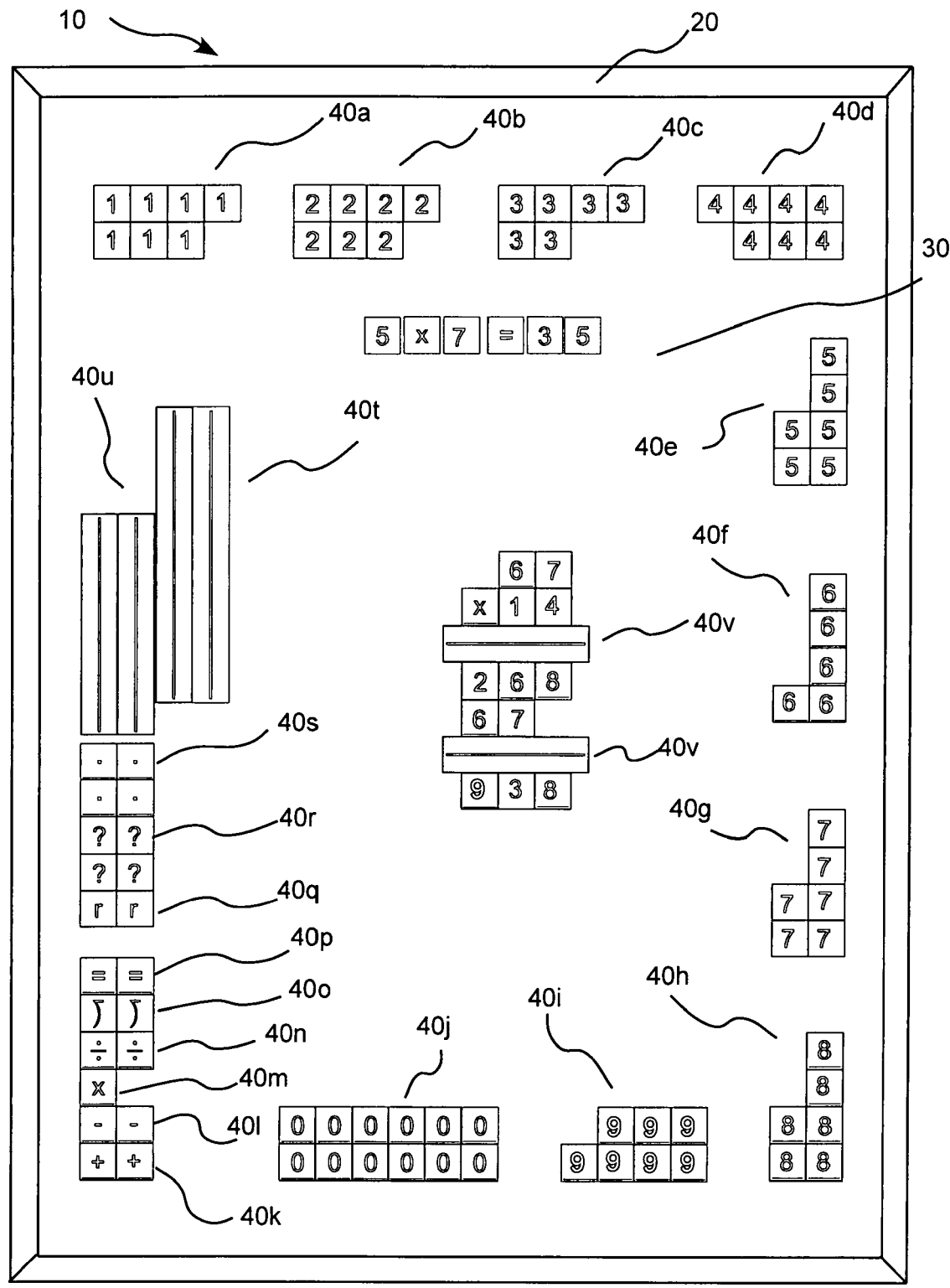
FIG. 1 illustrates a front view of an embodiment of a teaching device of the present invention for performing basic mathematical tasks or processes.

FIGS. 1 through 4 illustrate one embodiment of a teaching aid, system and/or method of the present invention that is useful in instructing blind or otherwise visually impaired students in mathematics. As used herein, the term "visually impaired" refers generally to a person having eyesight substantially below average (including the blind), which impairs their ability to, for example, follow instructions or lessons displayed in a classroom (for example, on a blackboard).

In this embodiment, the teaching aid 10 includes a frame 20 surrounding a work surface or work board 30 on which a visually impaired student can assemble movable character/ symbol elements or tiles 40$a$-$v$ into mathematical equations, problems or processes much as a sighted student would use a blackboard, a piece of paper or a marker board. In the embodiment of FIGS. 1-4, movable elements 40$a$-$v$ include the following symbols: numerals "1" through "9" and "0" (40$a$-40$j$, respectively), a plus sign (40$k$), a minus sign "−" (40$l$), a multiplication sign "×" (40$m$), a division sign "÷" (40$n$), a symbol used to form a division operator "⌐" (40$o$), an equal sign "=" (40$p$), a remainder symbol "r" (40$q$), a question mark "?" (40$r$), a decimal point "." (40$s$) and three different length bars or lines (40$t$-40$v$) used in forming or representing mathematical equations or processes. Of course, one skilled in the art, will recognize that many other symbols can be provided including, but not limited to, a dollar symbol "$", a cent symbol "¢" and a percent symbol "%".

Preferably, magnetic attraction is used to maintain movable elements 40a-40v in movable connection with board 30. In one embodiment, for example, board 30 is magnetically receptive (for example, the board can include a magnetically receptive, ferrous metal) and each of movable elements 40a-40v for assembling the mathematical problems, equations or processes includes a magnetic backing 42 (see FIG. 4) so that elements 40a-v are easily moved around board 30 but remain in place when positioned in a desired area. Of course, board 30 can be magnetic and movable elements 40a-40v can include a magnetically receptive material as a backing. Preferably, elements 40a-v and board 30 are formed so that elements 40a-v are readily and quickly slidable on the work surface of board 30 to form mathematical problems, equations or processes at generally any position on board 30. Moreover, the symbols of elements 40a-v are such that the mathematical problems, equations or processes substantially or closely resemble or match the form and appearance of mathematical problems, equations or processes used to explain mathematics to sighted students. A location or orientation guide such as an angled or notched upper right corner 46 as illustrated in FIGS. 3 and 4 can be provided to help a visually impaired or blind student properly orient movable elements 40a-v.

In one embodiment, frame 20 was formed from wood or plastic and work surface or board 30 was formed from painted steel. Of course, other magnetically receptive materials such as a plastic sheet with ferrous particles therein could be used for board 30. Preferably, the surface of board 30 is generally smooth to facilitate sliding of movable elements 40a-v thereon. In one embodiment, movable elements 40a-v were fabricated with a polymeric (for example, vinyl) front surface having printed thereon a symbol as described above. A clear sheet having corresponding Braille indicia thermoformed thereon was then laminated onto the polymeric material. Magnetic backing 42 is preferably sufficiently strongly magnetic to hold movable elements 40a-v in place, for example, when board 30 is in a vertical or other orientation and when lightly touched for reading by a visually impaired student, while allowing movable elements 40a-v to be slid around the surface of board 30 without use of excessive force.

In the embodiment of FIGS. 1-4, in addition to the visible mathematical symbol or a portion of a mathematical symbol as described above (which is readable by a sighted person), the front surface of each movable elements 40a-v also includes indicia of the visible symbol that is "readable" or understandable by a visually impaired person using the sense of touch. For example, the front of each of movable elements 40a-v can include raised indicia 44 (see FIGS. 3 and 4) as commonly used in the Nemeth Braille System.

Figure 5:
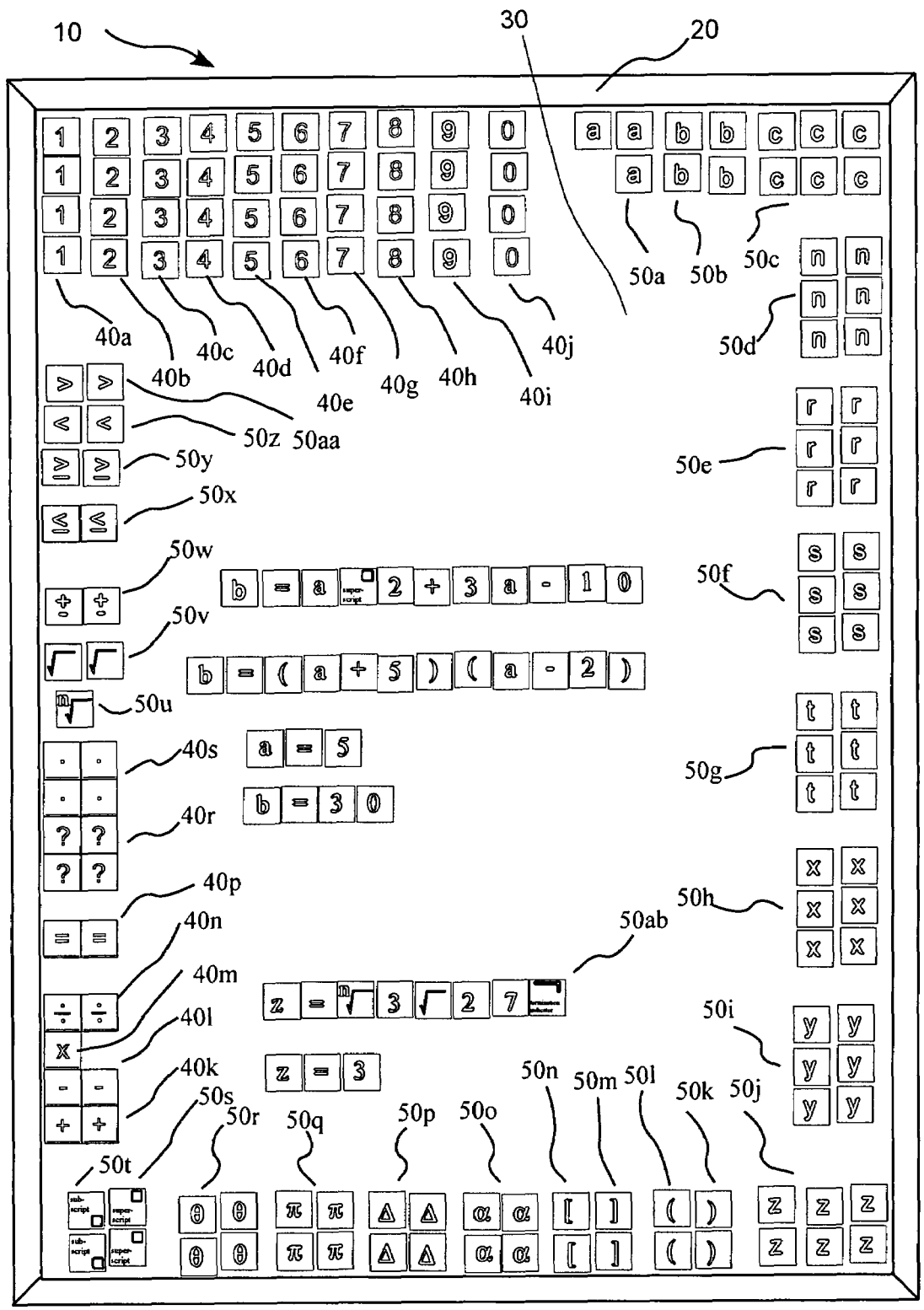
FIG. 5 illustrates a front view of an embodiment of the present invention for performing algebraic tasks or processes.
Figure 6:
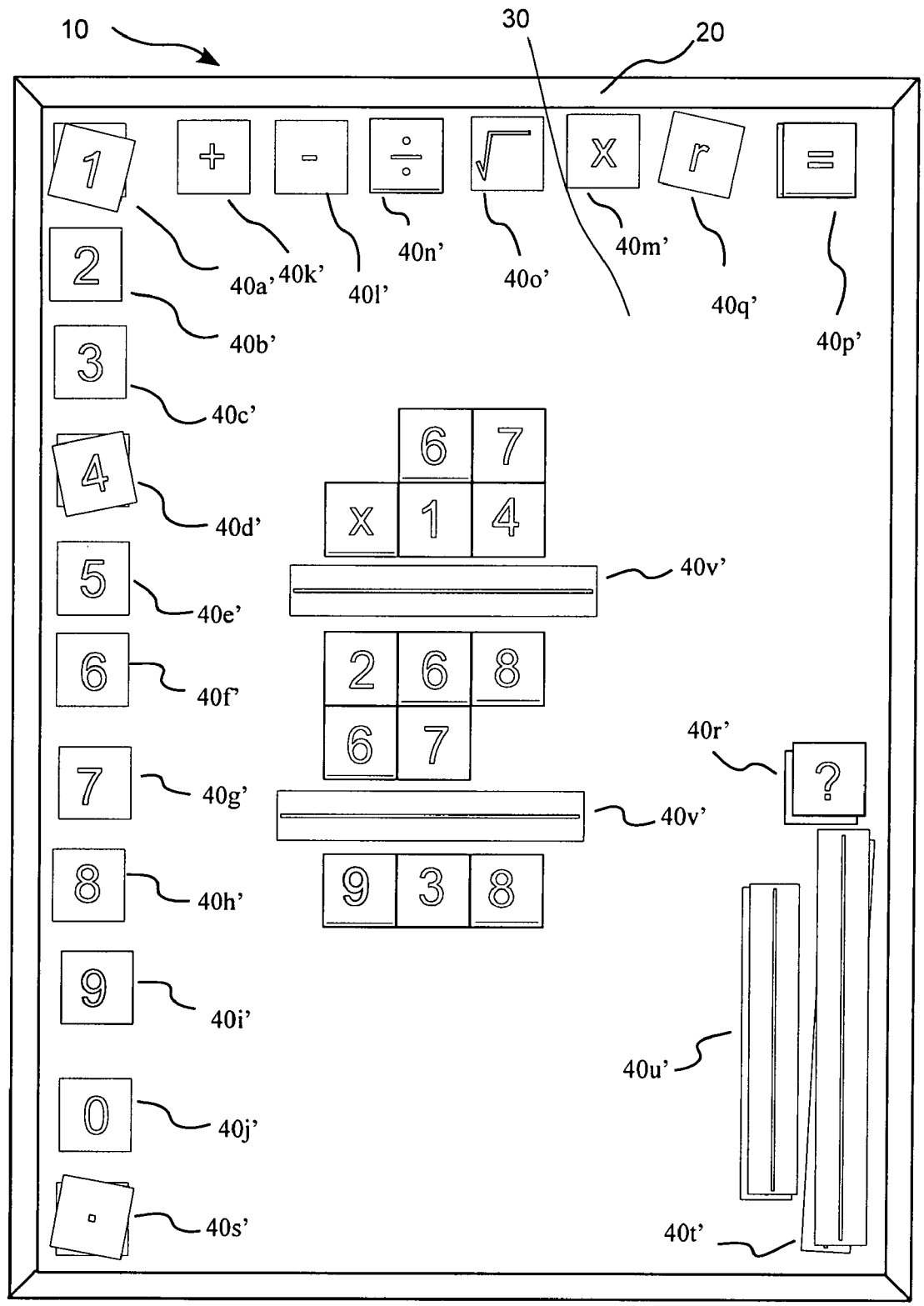
FIG. 6 illustrates a front view of an embodiment of the present invention in which movable element having like symbols are stacked in groups in unique positions about the edge of the work surface.

Preferably, there are multiple copies of each of movable elements 40a-v and thus multiple copies of each of the corresponding symbols. For example, as illustrated in FIGS. 1 and 2, there are multiple copies of each of the number symbol elements 40a-j as well as multiple copies of each of nonnumeric or operator/character symbol elements 40k-40v. Preferably, like elements are stored in groups at predetermined positions or student chosen positions for easy retrieval. For example, groups of like elements can be stored around the perimeter of the board 30 as illustrated in FIGS. 1, 5 and 6. Preferably, in this embodiment board 30 has sufficient surface area to allow storage of movable elements 40a-v around the perimeter of board 30 while providing ample room in the center of the board for the student to relatively quickly construct one or more mathematical problems, equations and processes. In one embodiment in which movable elements were 0.5 inches by 0.5 inches, for example, work surface or board 30 was approximately 10.5 inches by 13.5 inches. This size of board 30 was found to provide ample room for construction of mathematical problems, equations and processes while allowing easy carrying of teaching aid 30 in, for example, a backpack.

Positioning of movable elements 40a-v around the perimeter of board 30 enables, for example, rapid construction of mathematic problems, equations or processes so that a visually impaired student can, for example, follow spoken instructions while in a classroom (which may be a standard classroom with other, sighted students) and replicate on board 30 mathematical equations, problems or processes that may, for example, be drawn or otherwise displayed on a blackboard or other display by an instructor. FIG. 2, for example, replicates the multiplication problem of 432×15, the division problem of 21÷3, as well as the fraction ⅔ in a manner which corresponds with the manner in which a sighted student would represent those problems and fraction. In the representations of FIG. 2, bars or line symbols such as bar elements 40u and 40v are used as separation lines or as total lines as common with mathematical problems set forth in a vertical arrangement. Likewise bar element 40u and symbol element 40o are combined to form a division symbol as commonly used in a vertical arrangement of a division problem. As illustrated in FIG. 1, equal symbol element 40p can, for example, be used in problems set forth in a generally horizontal arrangement (for example, "5×7=35").

As illustrated in the representative embodiment of FIG. 5, symbols and operators for performing, for example, algebra, geometry, trigonometry and/or calculus corresponding to symbols and operators used by sighted students in those and other areas can be set forth for a student's use. In FIG. 5, in addition to many of elements 40a-v set forth above, additional elements 50a-v are provided for setting forth algebraic problems, equations and processes. In the embodiment of FIG. 5, movable elements 50a-u include, variables "a", "b", "c", "n", "r", "s", "t", "x", "y", "z", "α", "Δ", "π", and "θ" (50a, 50b, 50c, 50d, 50e, 50f, 50g, 50h, 50i, 50j, 50o, 50p, 50q and 50r, respectively), right parenthesis ")" (50k), left parenthesis "(" (50l), right bracket "]" (50m), left bracket "[" (50n), a superscript symbol "°" (50s), a subscript symbol "$_\circ$" (50t), an $n^{th}$ root symbol "$^n\sqrt{}$" (50u), a square root symbol "$\sqrt{}$" (50v), a plus/minus symbol "±" (50w), a less than or equal to symbol "≦" (50x), a greater than or equal to symbol "≧" (50y), a less than symbol "<" (50z), a greater than symbol ">" (50aa) and a termination indicator symbol "⌐" (50ab).

FIG. 6 illustrates another embodiment of the present invention in which movable elements 40a'-v' (having symbols corresponding to movable elements 40a-v) are stored in groups of like kind around the perimeter of work surface or board 30. In this embodiment, movable elements 40a'-40v' are generally twice the size of movable elements 40a-40v. Likewise, the visible symbols on movable elements 40a'-v' are generally twice the size as the corresponding symbols on movable elements 40a-v. Enlarging the symbol portion of the movable elements enables a visually impaired person with partial sight to read the symbols. Use of the teaching aid of FIG. 6 can also be beneficial for disabled or learning disabled students. Movable elements 40a'-v' can also include Braille indicia or Nemeth Braille indicia as described above. In several embodiments of the present invention, movable elements 40a-v were approximately 0.5 inches by 0.5 inches in size, while movable elements 40a'-v' were approximately 1 inch by 1 inch in size. Of course, one skilled in the art will recognize that the size of the movable elements of the present invention can be varied over a broad range. In several embodiments in which enlarged movable elements/symbols were used for visually impaired or otherwise disabled students, the printed symbols were at least 0.5 inch in height. For example, symbols in the range of approximately 0.5 inches to approximately 0.875 inches are suitable for use in the present invention in the case that the movable elements are approximately 1 inch by 1 inch.

Figure 7:
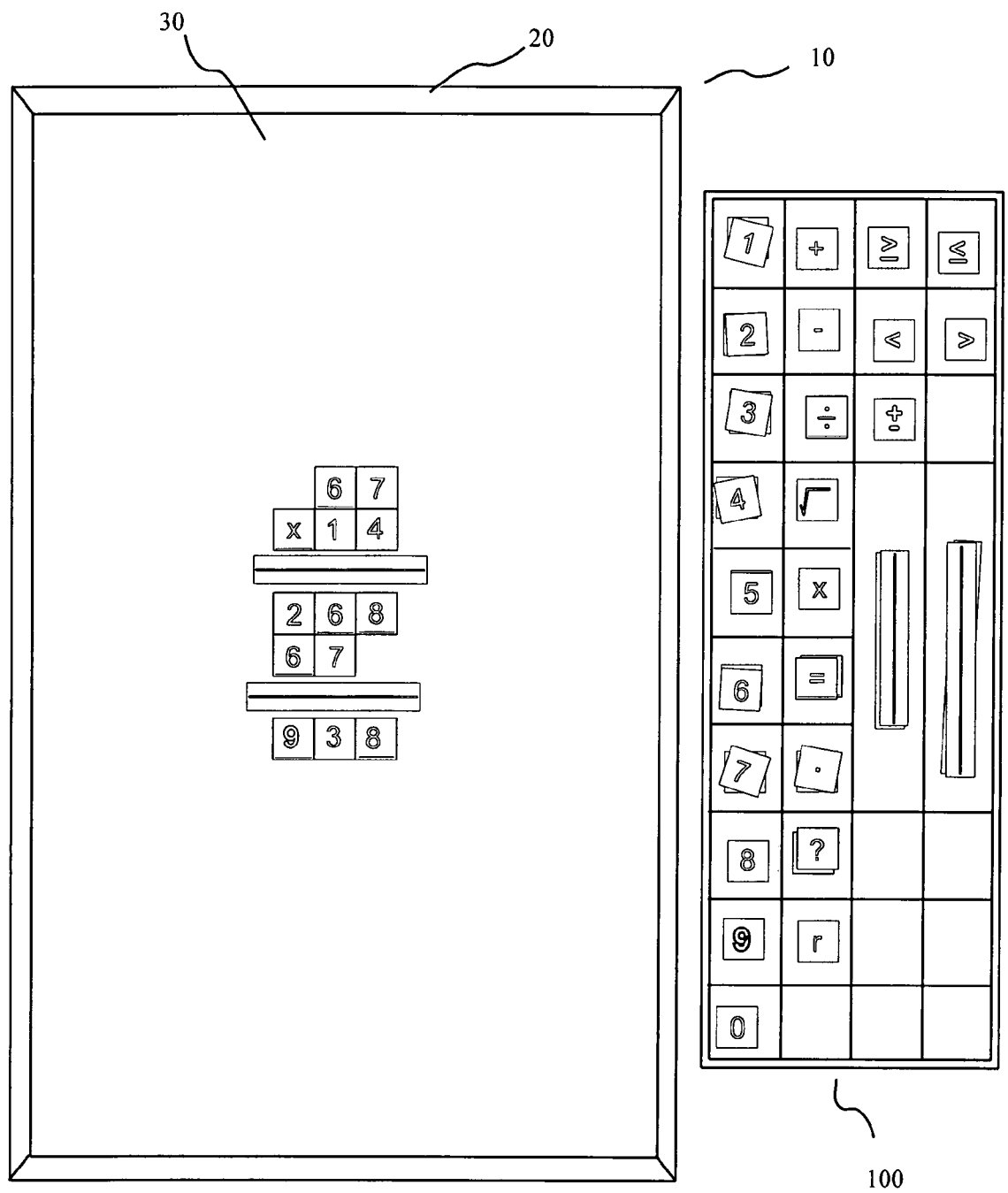
FIG. 7 illustrates a front view of an embodiment of the present invention in which movable elements having like symbols are grouped in individual compartments of a container for retrieval by a user of the device.

In the embodiment of FIG. 6, like elements are grouped by stacking them in space groups around the perimeter of board 30. FIG. 7 illustrates another embodiment of the present invention in which the movable elements are stored off of the board. In this embodiment, the movable elements are stored in a multicompartment storage container 100. A single-compartment box, boxes or other holder(s) can also be used. Each group of like elements can, for example, be stored in an individual compartment of storage container 100 (separate from other groups of like elements) to facilitate quick retrieval of a desired element/symbol.

The teaching aid of the present invention enables a visually impaired student to quickly keep pace with sighted students in a conventional classroom and provides a visually impaired student with the ability to learn mathematics using generally the same lexicon, symbols and problem/process/equation representations that a sighted student uses to learn mathematics. The teaching aid of the present invention also enables a sighted or visually impaired instructor to quickly and readily follow the work of a visually impaired student using the teaching aid of the present invention. The teaching aid of the present invention quickens the math learning process for visually impaired students and better prepares those students to perform mathematical operations as commonly experienced in everyday life.

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A system for instructing mathematics, comprising:
   a work surface;
   a frame around the work surface, the frame defining an abutment boundary for positioning of the movable elements; and
   a plurality of movable elements, each of the movable elements comprising, on a front surface thereof, at least a portion of a visible mathematical symbol thereon readable via eyesight, each of the movable elements further comprising an attachment member on a rearward surface to attach the moveable element to the work surface, the attachment member being adapted to allow the moveable element to be removed from the work surface and to be slidably positionable to generally any position on the work surface once attached thereto; the working surface having sufficient surface area to provide for positioning a plurality of the moveable elements around at least a portion of a perimeter of the work surface bounded by the frame from which the moveable element can be slid to form a standard mathematical expression.

2. The system of claim 1 wherein each of the movable elements further comprises Braille indicia on the front surface thereof corresponding to the at least a portion of the visible mathematical symbol.

3. The system of claim 1 wherein magnetic attraction is used to maintain the attachment member in movable connection with the board.

4. The system of claim 1 wherein the visible symbols on the movable elements are enlarged so as to be visible by a visually impaired person.

5. The system of claim 1 wherein a plurality movable elements are provided having the same symbol thereon for at least a portion of the symbols.

6. The system of claim 5 wherein each of the plurality of movable elements having a like symbol thereon is positioned in a group around the perimeter of the work surface, each of the groups of movable elements having a like symbol thereon being spaced in position from the other groups.

7. The system of claim 5 wherein each of the plurality of movable element having a like symbol thereon is positioned in a stacked group around the perimeter of the work surface, each of the stacked groups of movable elements having a like symbol thereon being spaced in position from the other groups.

8. The system of claim 1 further comprising a multicompartment storage container, each movable element with a different symbol thereon are storable in a separate compartment of the storage container.

9. The system of claim 2 wherein the Braille indicia are Nemeth Braille indicia.

10. The system of claim 9 wherein a plurality movable elements are provided having the same symbol thereon for at least a portion of the symbols.

11. The system of claim 10 wherein each of the plurality of movable elements having a like symbol thereon is positioned in a group around the perimeter of the work surface, each of the groups of movable elements having a like symbol thereon being spaced in position from the other groups.

12. The system of claim 10 wherein each of the plurality of movable elements having like symbols thereon is positioned in a stacked group around the perimeter of the work surface, each of the stacked groups of movable elements being spaced in position from the other groups.

13. The system of claim 1 wherein the visible symbols include numerals from 0 to 9, a plus sign, a minus sign, a multiplication sign, a division sign, an equal sign, and at least one type of bar for representing processes.

14. The system of claim 13 wherein the symbols further include a decimal point, a question mark and a remainder symbol.

15. A method for instructing mathematics, comprising:
   providing a work surface to a student, the work surface comprising a frame around the work surface, the frame defining an abutment boundary for positioning of the movable elements;
   providing a plurality of movable elements for use in connection with the work surface, each of the movable elements comprising on a front surface thereof at least a portion of a visible symbol readable via eyesight, each of the movable elements further comprising Braille indicia on the front surface thereof corresponding to the at least a portion of the visible mathematical symbol, each of the moveable elements further comprising an attachment member on a rearward surface to attach the moveable element to the work surface, the attachment member being adapted to allow the moveable element to be removed from the work surface and to be slidably positionable to any position on the work surface once attached thereto; and having the student position a plurality of the moveable elements around at least a potion of a perimeter of the surface bounded by the frame from which the moveable element can be slid to form a standard mathematical expression.

16. The method of claim 15 wherein magnetic attraction is used to maintain the attachment member in movable connection with the board.

17. The method of claim 15 wherein the visible symbols on the movable elements are enlarged so as to be visible by a visually impaired person.

18. The method of claim 15 wherein a plurality movable elements are provided having the same symbol thereon for at least a portion of the symbols.

19. The method of claim 18 wherein each of the plurality of movable elements having a like symbol thereon is positioned in a group around the perimeter of the work surface, each of the groups of movable elements having a like symbol thereon being spaced in position from the other groups.

20. The method of claim 18 wherein each of the plurality of movable elements having a like symbol thereon is positioned in a stacked group around the perimeter of the work surface, each of the stacked groups of movable elements having a like symbol thereon being spaced in position from the other groups.

21. The method of claim 15 further comprising the step of having the student store the movable elements in a multicompartment storage container when the movable elements are not attached to the work surface, each movable element with a different symbol thereon being storable in a separate compartment of the storage container.

22. The method of claim 15 wherein the Braille indicia are Nemeth Braille indicia.

23. The method of claim 22 wherein a plurality movable elements are provided having the same symbol thereon for at least a portion of the symbols.

24. The method of claim 23 wherein each of the plurality of movable element having a like symbol thereon is positioned in a group around the perimeter of the work surface, each of the groups of movable elements having a like symbol thereon being spaced in position from the other groups.

25. The method of claim 23 wherein each of the plurality of movable element having a like symbol thereon is positioned in a stacked group around the perimeter of the work surface, each of the stacked groups of movable elements having a like symbol thereon being spaced in position from the other groups.

* * * * *